(12) United States Patent
Huang et al.

(10) Patent No.: US 10,884,805 B2
(45) Date of Patent: Jan. 5, 2021

(54) DYNAMICALLY CONFIGURABLE OPERATION INFORMATION COLLECTION

(71) Applicant: Amazon Technologies, Inc., Seattle, WA (US)

(72) Inventors: Wei Huang, Shoreline, WA (US); Matt Nakoneczny, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 186 days.

(21) Appl. No.: 15/898,030

(22) Filed: Feb. 15, 2018

(65) Prior Publication Data

US 2019/0250950 A1    Aug. 15, 2019

(51) Int. Cl.
| | |
|---|---|
| G06F 9/455 | (2018.01) |
| G06F 9/50 | (2006.01) |
| G06N 20/00 | (2019.01) |

(52) U.S. Cl.
CPC .......... *G06F 9/5005* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 7,792,770 | B1 * | 9/2010 | Phoha | G06N 20/00 706/45 |
| 9,479,518 | B1 * | 10/2016 | Fang | H04L 63/14 |
| 10,061,632 | B2 * | 8/2018 | Ben Simhon | G06F 11/0721 |
| 10,223,644 | B2 * | 3/2019 | Gadde | G06N 20/00 |
| 10,459,827 | B1 * | 10/2019 | Aghdaie | G06F 11/0751 |
| 10,560,309 | B1 * | 2/2020 | Chitalia | H04L 41/0631 |
| 2014/0278729 | A1 * | 9/2014 | Liu | G06Q 10/103 705/7.28 |
| 2017/0104657 | A1 * | 4/2017 | Gopalakrishnan | G06K 9/622 |
| 2017/0250919 | A1 * | 8/2017 | Kessel | H04L 63/1425 |
| 2019/0042353 | A1 * | 2/2019 | Ahad | G06F 11/0751 |
| 2019/0056969 | A1 * | 2/2019 | Khandros | G06N 20/00 |
| 2019/0095507 | A1 * | 3/2019 | Elisseeff | G06N 3/006 |
| 2019/0149565 | A1 * | 5/2019 | Hagi | H04L 63/1425 726/23 |
| 2019/0327251 | A1 * | 10/2019 | Muddu | G06F 16/254 |

FOREIGN PATENT DOCUMENTS

EP    3460727 A1 *    3/2019    .......... B61L 27/0094

OTHER PUBLICATIONS

Aufderheide, Helge, "Method for examining a functional behavior of a technical system and evaluation unit", Sep. 26, 2017 priority date, Google Patents English Translation.*

* cited by examiner

*Primary Examiner* — Kenneth Tang
(74) *Attorney, Agent, or Firm* — Knobbe, Martens, Olson & Bear, LLP

(57) ABSTRACT

Systems and methods are described for the collection and transmission of virtual machine resource operations information. Individual agents on virtual machine resources collect and store operations information in accordance with a current operations information collection configuration. The individual agents will initiate a transmission of the collected operations information. Responsive to the receipt of the transmission of the collected operations information, the monitoring processing service calculates a hierarchy of anomaly scores utilizing machine learning techniques. The monitoring processing service can generate a processing result.

20 Claims, 7 Drawing Sheets

DYNAMICALLY CONFIGURABLE OPERATION INFORMATION COLLECTION

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some environments, the virtual machine resources can be configured for implementation of specific functionality or otherwise configured to include selected software applications. In accordance with the implementation of the specific functionality or selected functionality, the virtual machine resources can collect operations information for processing or analysis by the service provider or customer.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
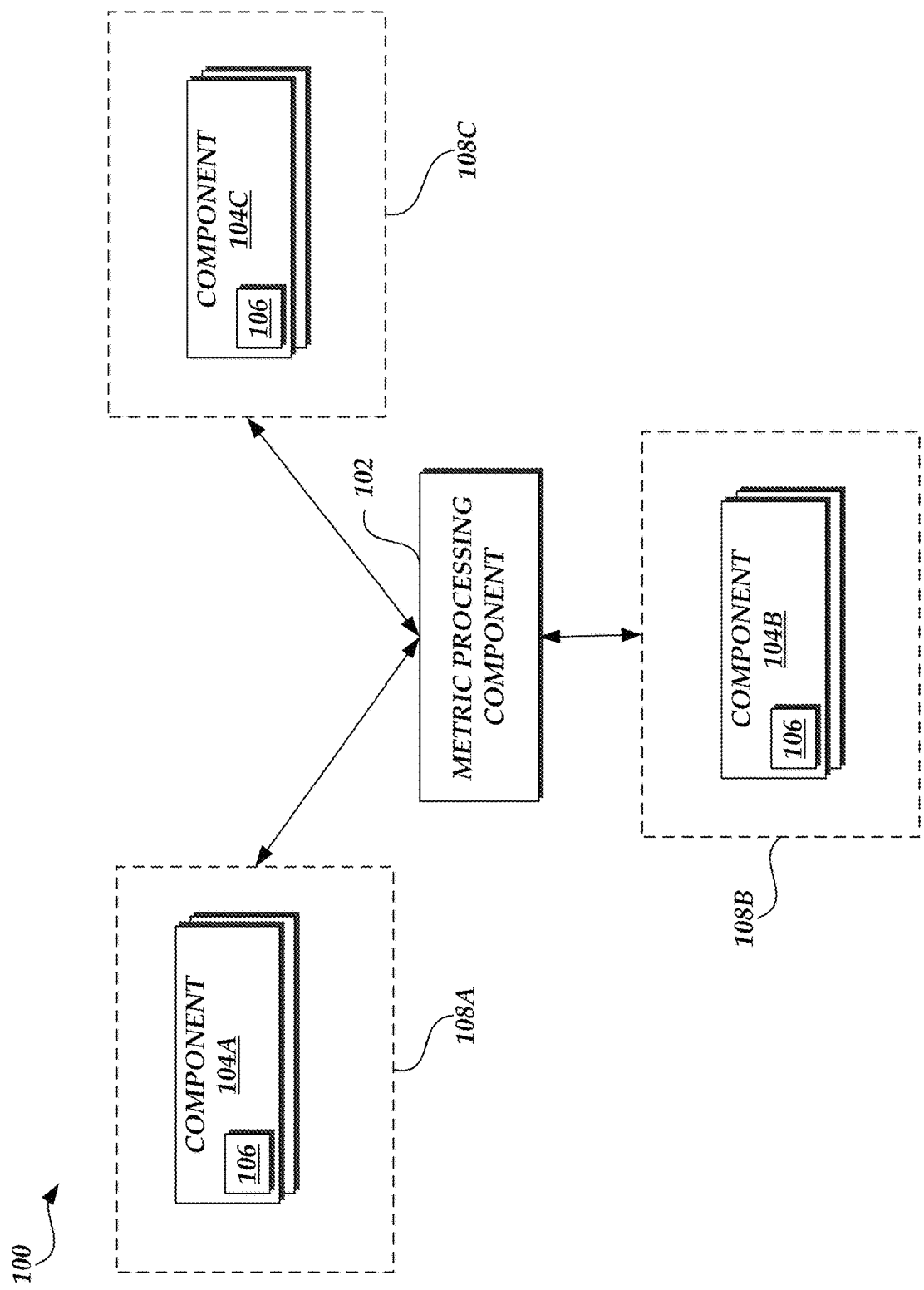
FIG. 1 is a block diagram depicting a service provider system for managing virtual machine resource operations information and a monitoring processing component.

Generally described, the present application corresponds to the processing of information transmitted between computing devices in a communication network. More specifically, aspects of the present application correspond to the processing of virtual machine resource operations information for determining anomalies in the execution of the virtual machine instances. Illustratively, one or more virtual machine resources are hosted on physical computing devices provided by a service provider and configured in accordance with individual customer or client configurations. In addition to the software applications, operating environments and other configurations specified by the customer, the virtual machine resources include one or more software components, generally referred to as agents, that collect various information related to the instantiation and execution of the virtual machine resources. Such information, generally referred to as operations information, performance information or metric information, can include, but is not limited to file system information, networking interface information, and computing device resource information. Accordingly, reference to operations information in the present application should not be construed as limiting as to any particular type of information or excluding any type of information that may be generated by or measured in accordance with the operation of virtual machine resources.

In accordance with some embodiments, the agents on the virtual machine resources are configured to process collected operations information and then transmit the processed (or unprocessed) operations information to a metric processing component provided by the service provider. The monitoring processing service can utilize machine learning techniques to review the collected operations information to identify potential anomalies in the operation of the virtual machine resources. Based on identified anomalies, the monitoring processing service can then conduct causal analysis of reported errors, validate service level agreements regarding performance, generate optimization information, and the like. The metric processing component will typically act on the processed information by generating corrective actions, notifications, etc. Additionally, the metric processing component will typically utilize a storage service or other network storage for maintaining the reported/transmitted operations information.

Generally described, the metric processing component can receive operations information that can correspond to a large number of individual metrics provided by the agents on the virtual machine resources. In some embodiments, a metric processing component can analyze each individual metric by analyzing individual metric attributes or values against rules or thresholds. Such approaches can be deficient, however, in that monitoring individual operations information (e.g., individual metrics) can be difficult to manage for a large number of collected metrics, especially for a large collection of virtual machine instances or physical computing devices that are generating the operations information. Additionally, analyzing individual metrics can be deficient in failing to identify potential relationships between metrics or metric attributes. For example, an analysis of individual metric attributes may not be indicative of an anomaly (e.g., all metric attributes below a threshold). But, consideration of a grouping of metric attributes including the individual metrics can be indicative of an anomaly (e.g., two matching metric attributes are indicative of a fault or two non-matching metric attributes are indicative of a fault).

In some embodiments, a metric processing component can utilize machine learning techniques to process collected metric information to identify potential anomalies. Generally described, such machine learning techniques typically involve receiving a list of metrics as input and generating a single output corresponding to an anomaly score representative of a characterization of anomalies in any of the metric attributes or combination of metric attributes. One example of a machine learning technique is the Principle Core Analysis ("PCA") algorithm that involves an orthogonal transformation to convert a set of inputted metrics into linearly uncorrelated variables. Another example of a machine learning technique is the Random Cut Forest Tree algorithm that utilizes tree/node structure to identify outlier values based on optimize of tree nodes. In such machine learning algorithms, collected metric processing services can utilize inputted training sets that identify anomalies to train and refine the machine learning output of the algorithms.

Although the inclusion of machine learning techniques in metric processing can address some of the deficiencies associated with individual operations information monitoring, such machine learning techniques can be susceptible to false positives. More specifically, because machine learning techniques input a series of metrics, such as in an array of metric attributes, any large variation in individual metric attributes can be interpreted by some machine learning techniques as an anomaly. For example, assume a collected metric includes has nominal, low attributes for a period of three hours during a time window. After the three hours, a component executes a process that causes the collected metric to expectedly increase in attribute value substantially. In embodiments incorporating a single machine learning technique to analyze the collected metrics, such as PCA or Random Cut Forest, the substantial increase in one of the collected metrics would appear to be an anomaly from the previous collected metric data and the single anomaly score could resulted in a characterization of an anomaly. Accordingly, as the amount of operations information that is collected increased (e.g., a larger number of inputted metrics), the potential for false positive anomaly identification increases. This creates additional inefficiencies in the reliability of the metric processing component and in attempting to identify which of the possibility large metric attributes caused the anomaly score.

In accordance with aspects of the present application, individual agents on virtual machine resources collect and locally store collected operations information in accordance with a current operations information collection configuration. The agents will illustratively store all the collected operations information in a locally accessible data store and in way such that more collected operations information is stored by the individual agent than is transmitted to the monitoring processing service. At some point during the operation of individual virtual machine resource operation, corresponding agents will initiate a transmission of the collected operations information. The agents will include a set of collected operations information and an identification of the current operations information collection configuration being implemented by the respective agent.

Responsive to the receipt of the transmission of the collected operations information, the metric processing component can process the collected operations information. More specifically, in accordance, the metric processing component can organize the collected operations information into a system hierarchy defined by multiple levels. The order of the hierarchy can include a system level, one or more region levels that form the system level, one or more component levels that form the individual region levels, and one or more group levels that form the individual component levels and are based on the collected operations information.

To process the collected operations information, each of the collected operations information (e.g., individual metric attributes) is associated with at least one group level and the metric processing component can apply one or more machine learning techniques to generate group-level anomaly scores. Illustratively, the group-level elements or nodes represent collections of individual metrics based on some form of criteria. For example, group level criteria may be based on types of operations information (e.g., file system or network connectivity), time of collection, size, file type, and the like. The metric processing component can then apply individual group-level anomaly scores as inputs into another iteration of a machine learning technique to generate component-level anomaly scores. Still further, the metric processing component can then apply individual component-level anomaly scores as inputs into another iteration of a machine learning technique to generate region-level anomaly scores. Finally, the metric processing component can then apply individual region-level anomaly score as inputs into yet another iteration of a machine learning technique to generate a system-level anomaly score. Accordingly, the collected operations information is directly utilized to generate group-level anomaly scores. Although described as having the four distinct levels, the metric processing component can incorporate different or alternative levels in the hierarchy or otherwise remove a level, such as the region level from the hierarchy.

By utilizing multiple iterations of a machine learning technique at individual levels of the hierarchy, the metric processing component can reduce the number of false positives. More specifically, each iteration of machine learning technique could be trained for the smaller subset of inputs. For example, individual group-level machine learning techniques could be better trained as to the expected variances for the collected operations information (e.g., file system information) that are being processed. Accordingly, the machine learning technique could be given a training set that would be better able to identify anticipated changes in metric attributes (e.g., know spikes in metric attributes). By allowing for more refined training, especially at the group-level, the generated group-level anomaly scores that are determined to be acceptable would prevent any identification of anomalies in the component, region, and system levels. Additionally, in the event of an anomaly in any of the group-level anomaly scores, the anomaly would propagate to the system level but would facilitate incident analysis by identifying individual regions, components, and groups that generated or contributed to the characterized anomaly. As will be explained, a system level anomaly score can be examined to determine the region level score that contributed or caused the system level anomaly score/characterization. The determined region level score can be examined to determine the component level score that contributed or caused the determined region level anomaly score/characterization. Still further, the component level score can be examined to determine the group level score that contributed or caused the component level anomaly score/characterization. Finally, the group level score can be examined to determine individual operations information that contributed or caused the group level anomaly score/characterization.

Although aspects of some embodiments described in the disclosure will focus, for the purpose of illustration, on specific examples of collected operations information or specific processing techniques for collected operations information by a monitoring processing service, one skilled in the relevant art will appreciate that the examples are illustrative only and are not necessarily intended to be limiting. As will be appreciated by one of skill in the art in light of the present disclosure, the embodiments disclosed herein improves the ability of computing systems, and particularly computing systems with limited localized user interfaces, to be coordinated and managed by an external device. The foregoing aspects and many of the attendant advantages of this disclosure will become more readily appreciated as the same become better understood by reference to the following description, when taken in conjunction with the accompanying drawings.

FIG. 1 is a block diagram depicting an illustrative service provider network 100. For purpose of illustrating aspects of the present application, the service provider network 100 includes three or more hosting environments, illustrated in FIG. 1 as hosting environments 108A, 108B, and 108C. As described in further detail below, the hosting environments 108A, 108B and 108C can be associated with multiple geographic or logical regions associated or defined by the service provider. Each region can include a plurality of components that corresponding to physical computing devices or host virtualized applications 104A, 104B, 104C for executing applications or code. As will be described in detail below, each component includes an agent 106 that collects information regarding the general operation or functionality of the hosting environment and transmits at least a subset of the collected operations information based on an operations information collection configuration.

With continued reference to FIG. 1, the service provider network 100 also includes a metric processing component 102. The metric processing component 102 is operable to receive collected operations information from a plurality of hosting environments, such as components 104A, 104B, and 104C, that are representative of components from individual regions or defined geographic areas. Additionally, as described above, the metric processing component 102 can generate and manage a hierarchical structure of anomaly scores to identify potential anomalies in the operation of the individual groups of metrics for components 104, regions 108 or the service provider network 100 (e.g., the system).

It will be appreciated by those skilled in the art that the service provider network 100 may have fewer or greater components than are illustrated in FIG. 1. Thus, the depiction of the service provider network 100 in FIG. 1 should be taken as illustrative. For example, in some embodiments, components of the service provider network 100, such as the metric processing component 102, may be executed by one more virtual machines implemented in a hosted computing environment. Additionally, the components 104 may correspond to multiple physical or virtual computing resources that may logically represented as a single component, but may be implement in a distributed manner. Additionally, although now illustrated in FIG. 1, the service provider network 100 would include various communication network components such as private or public network components that would facilitate the exchange of operations information. Still further, the service provider network 100 could generate information to various additional computing devices, such as client computing devices that would receive notifications of anomalies or receive configurations for the collection of metrics.

Figure 2:
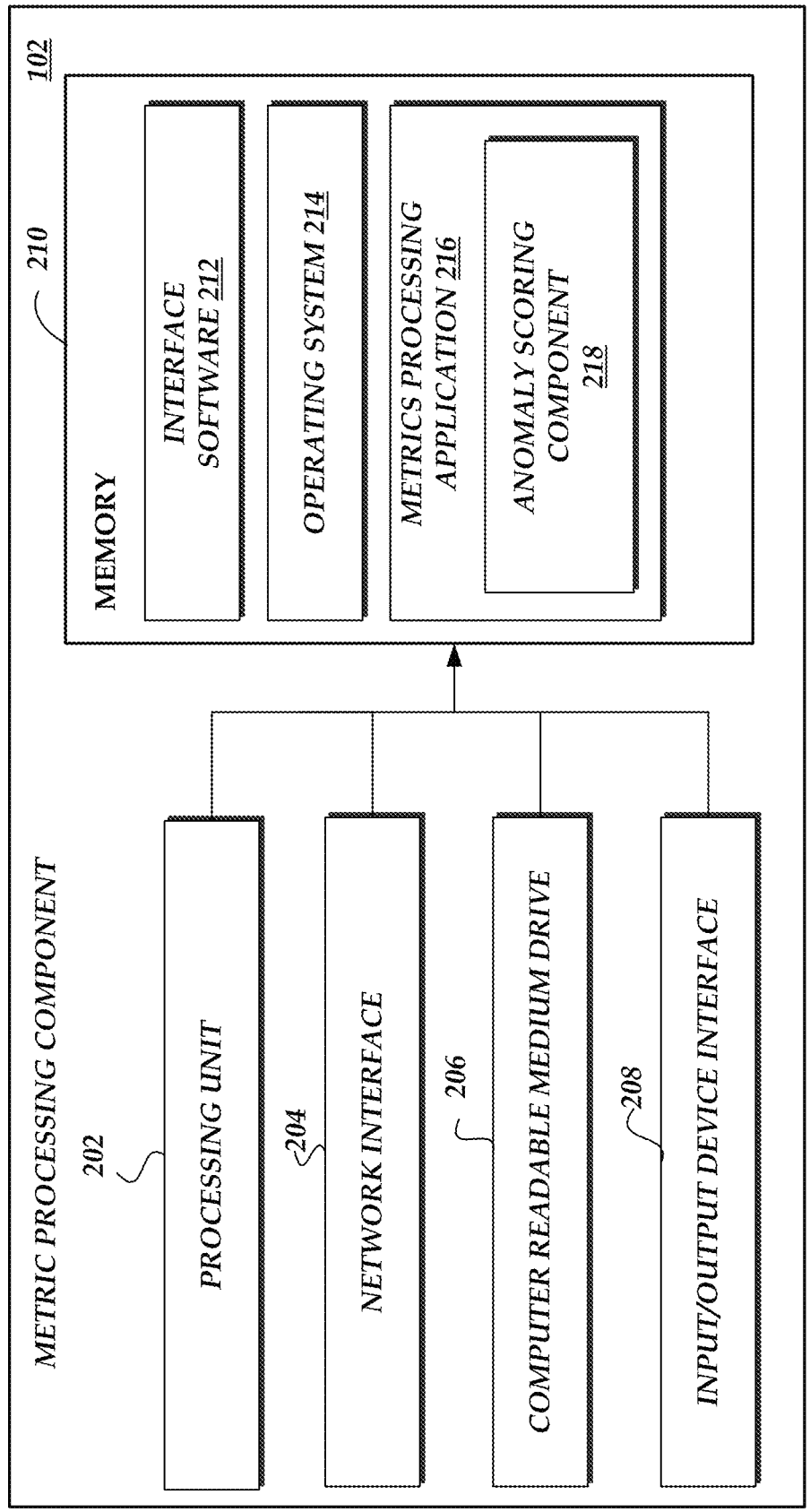
FIG. 2 depicts a general architecture of a computing device providing a metric processing component for processing operations information and providing operations information collection configurations to virtual machine resources.

FIG. 2 depicts one embodiment of an architecture of an illustrative computing device for implementing the metric processing component 102 described herein. As illustrated, the metric processing component 102 includes a processing unit 202, a network interface 204, a computer readable medium drive 206, and an input/output device interface 208, all of which may communicate with one another by way of a communication bus. Although not illustrated in FIG. 2, the metric processing component 102 can include possible input and output devices typically associated with computing devices.

The network interface 204 may provide connectivity to one or more networks or computing systems, such as the components 104. The processing unit 202 may thus receive information and instructions from other computing systems or services via a network. The processing unit 202 may also communicate to and from memory 210 and further provide output information via the input/output device interface 208. The input/output device interface 208 may also accept input from various input devices.

The memory 210 may include computer program instructions that the processing unit 202 executes in order to implement one or more embodiments. The memory 210 generally includes RAM, ROM, or other persistent or non-transitory memory. The memory 210 may store an operating system 214 that provides computer program instructions for use by the processing unit 202 in the general administration and operation of the metric processing component 102. The memory 210 may further include computer program instructions and other information for implementing aspects of the present disclosure. For example, in one embodiment, the memory 210 includes an interface component 212 for receiving collected operations information from the components 104 of the service provider network 100. Additionally, the memory 210 includes a metrics processing application 216 for collecting and processing collected information/metrics. The metrics processing application can further include one or more anomaly scoring components 218 that correspond to one or more machine learning techniques, such as PCA or Random Cut Forest, operable to receive a set of inputs, apply machine learning and generate an output indicative of a single anomaly score for the set of inputs. The metric processing application 126 can identify one or more inputs that contributed to or caused the generated anomaly score for an iteration of the machine learning technique. One skilled in the relevant art will appreciate that variations of the identified machine learning techniques, alternative machine learning techniques or combinations of machine learning techniques may also be incorporated in the anomaly scoring component 218. Additionally, although the metric processing component 102 component is illustrated as a single computing device, one skilled in the relevant art will appreciate that the functionality associated with the metric processing component 102 may be implemented in a distributed manner.

Figure 3:
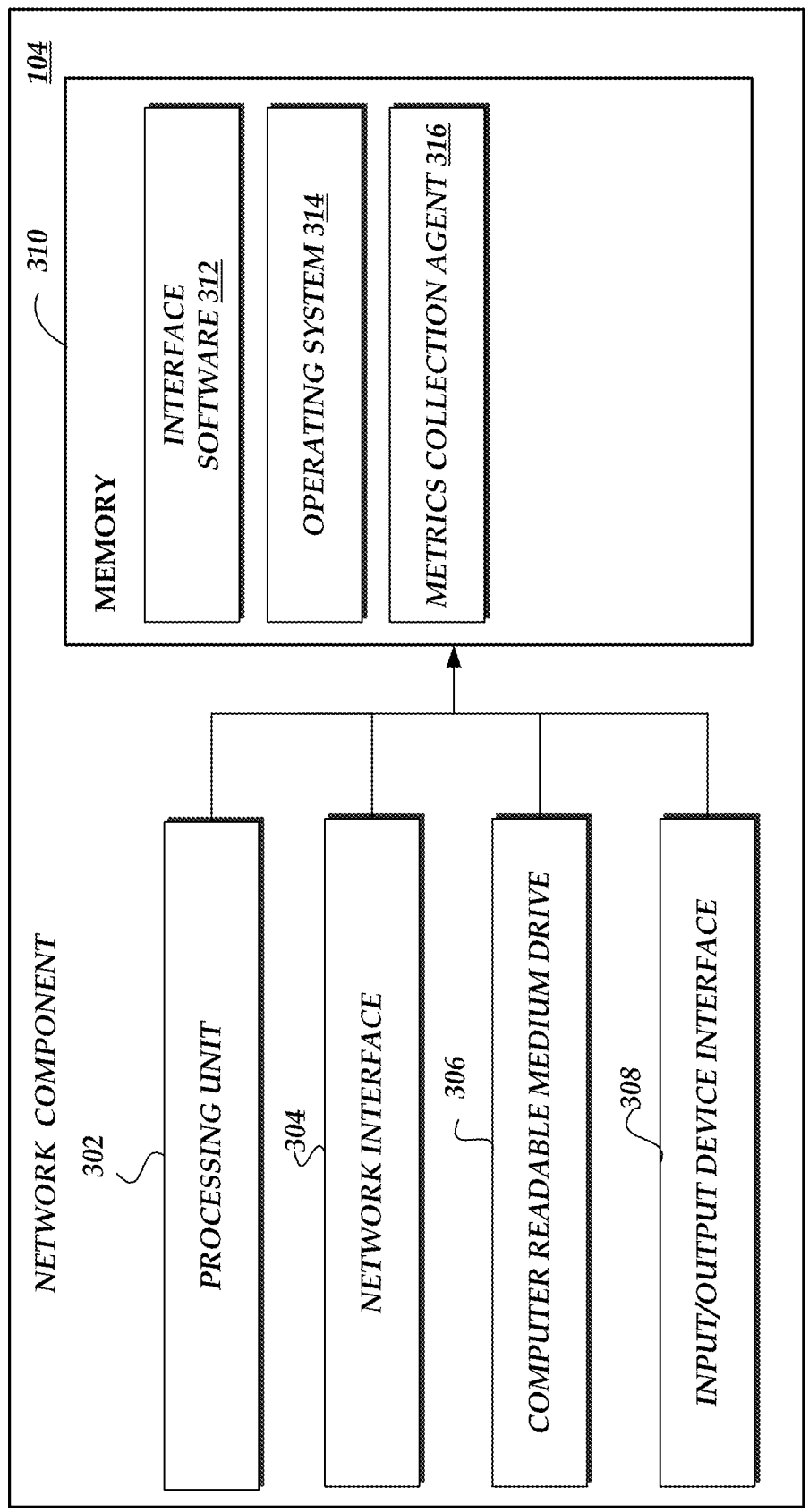
FIG. 3 depicts a general architecture of a computing device collecting and providing operations information.

FIG. 3 depicts one embodiment of an architecture of an illustrative computing device for implementing one of the network components 104 described herein. As illustrated, the component 104 includes a processing unit 302, a network interface 304, a computer readable medium drive 306, an input/output device interface 308, all of which may communicate with one another by way of a communication bus. Although not illustrated, the network component 104 can also include various input or output devices in some embodiments.

The network interface 304 may provide connectivity to one or more networks or computing systems, such as the metric processing component 102 or other components 104. The processing unit 302 may thus receive information and instructions from other computing systems or services via a network. The processing unit 302 may also communicate to and from memory 310 and further provide output information via the input/output device interface 308. The input/output device interface 308 may also accept input from various input devices.

The memory 310 may include computer program instructions that the processing unit 302 executes in order to implement one or more embodiments. The memory 310 generally includes RAM, ROM, or other persistent or non-transitory memory. The memory 310 may store an operating system 314 that provides computer program instructions for use by the processing unit 302 in the general administration and operation of the virtual machine resources component. The memory 310 may further include computer program instructions and other information for implementing aspects of the present disclosure. For example, in one embodiment, the memory 310 includes additional software which generally represents one or more software components that are implemented to provide the configured functionality of the virtual machine resources component. Examples include, but are not limited, database components or software application, storage components or software applications, data processing components or software applications, social media network or web applications or components, and the like. Additionally, the memory 310 includes a metrics collection agent 316 for implementing an operations information collection configuration including the collection of various operating information/metrics, local storage of collected information/metrics, local processing of collected information/metrics and transmission of collected operations information to a monitoring processing service. Although the monitoring processing service component is illustrated as a single computing device, one skilled in the relevant art will appreciate that the functionality associated with the metric processing component may be implemented in a distributed manner.

Figure 4:
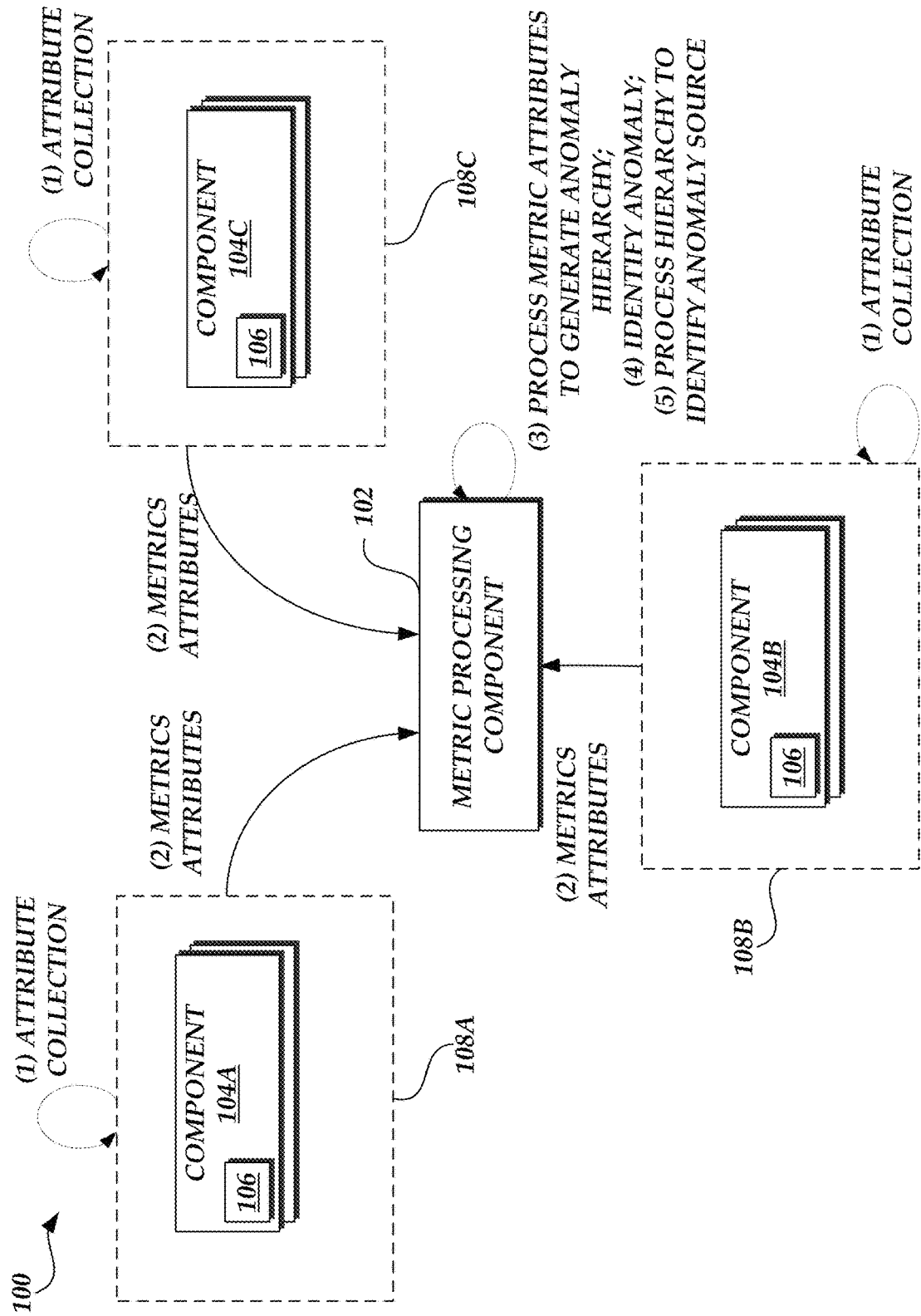
FIG. 4 is a block diagram of the illustrative environment of FIG. 1 depicting illustrative interactions for collecting and exchanging collected operations information in accordance with aspects of the present application.

Turning now to FIG. 4, illustrative interactions between the components of the service provider network 100 to manage the collection and processing of operations information will be described. More specifically, FIG. 4 will be described with regard to interactions between multiple components 104 and the metric processing component 102. The interactions illustrated in FIG. 4 begin with consideration that the service provider network 100 has instantiated and configured three sets of components 104A, 104B, and 104C executing instructions. Each of the components 104A, 104B, and 104C correspond to different respective regions 108A, 108B, and 108C.

At (1), individual components 104A, 104B, and 104B are executing one or more software applications. The agent 106 on each component 104A, 104B, and 104C collects or otherwise facilitates the collection of various operations information related to operation of the virtual machine resource. As previously described, the operations information can include, but is not necessarily limited to, file system information, network interface information and resource consumption information. For example, the agent 106 can collect information related to CPU utilization during a defined time window or a specified time intervals. In another example, the agent 106 can collect operations information related to measure packet loss rates, network packet retransmission rates, etc. In still other example, the agent 106 can collect operations information related to times and success rates for various virtual machine resource I/O operations, such as data reads or data write operations. In still a further example, the agent 106 can collect any error conditions or error logs generated during the operation of the components 104A, 104B, and 104C. For purposes of the present application, the collected operations information can be identified by individual metrics (e.g., CPU utilization or input/output reads). Additionally, each metric can be further defined by the specific attributes or values collected (e.g., a CPU utilization of x % at time Y). Such definitions are provided solely for purposes of illustrating the present application and should not construed as limiting.

Illustratively, the agents can store and process the collected operations information in accordance with a current operations information collection configuration. Illustratively, an operations information collection configuration can specify the types of operations information that should be collected, the amount of operations information that should be stored locally, additional data analytics that should be carried out locally, and criteria for determining when collected operations information should be transmitted to the metric processing component 120. Additionally, periodically the agents 106 decide (e.g., individually or collectively) that a reporting event has occurred that will cause the agent 106 to transmit collected operations information (e.g., metric attributes) at (2). For example, if an operations information collection configuration specifies a time interval for transmitting collected operations information, the determination of transmission can be a simple identification of the expiration of the specified time period. In another example, if an operations information collection configuration specifies a specific value of a collected operation information (e.g., CPU utilization) or a determined trend (e.g., an extrapolated set of operations information values), the agent 106 utilizes the processing of the operations information in making the determination that a reporting event has occurred. Illustratively, the agent 114 can transmit all of the collected operations information or a subset of the collected operations information based on the current operations information collection configuration being implemented by the agent.

Figure 5:
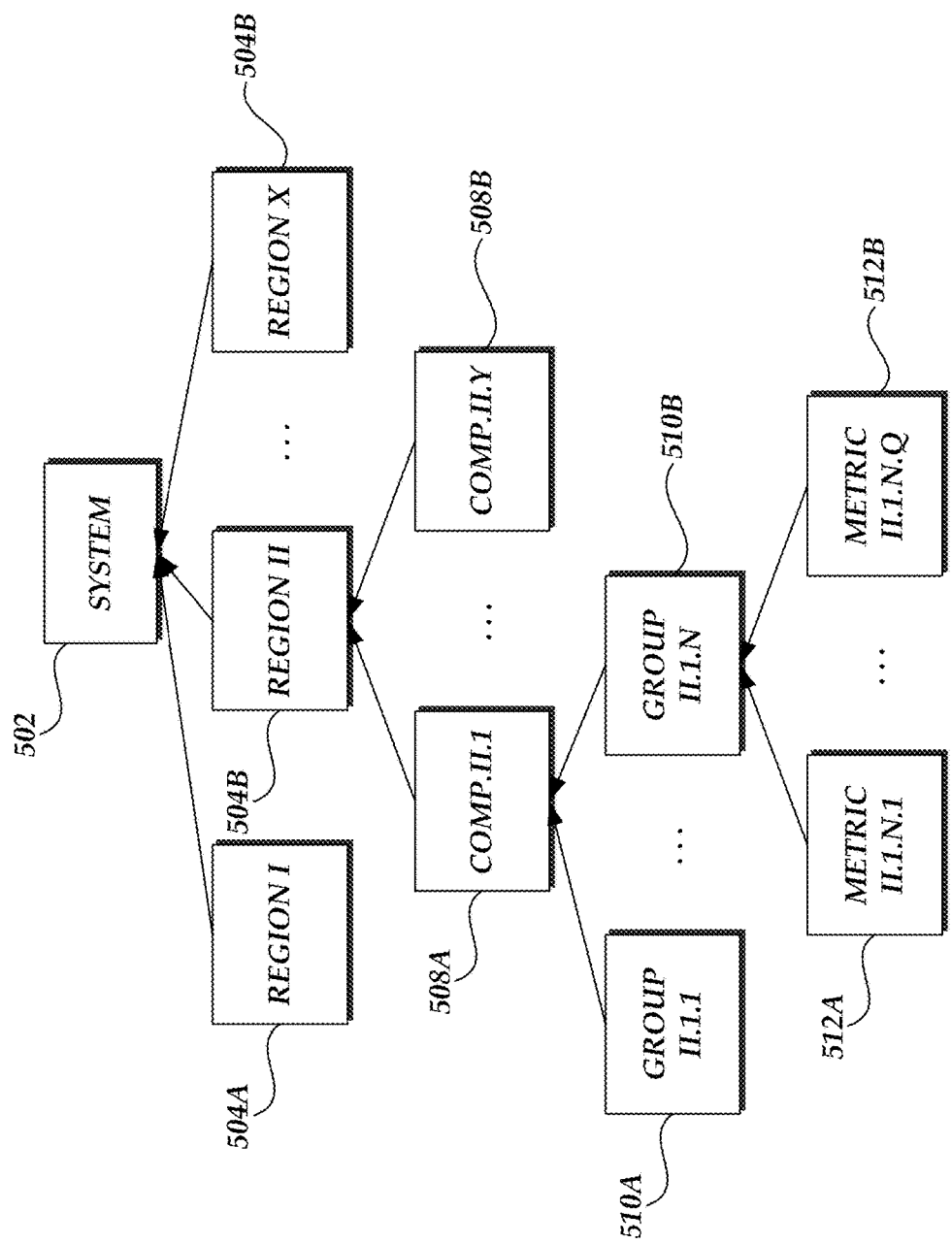
FIG. 5 is a block diagram illustrating an illustrative hierarchy anomaly hierarchy utilized to processing collected operations information and identify anomalies.

At (3), the metric processing component 102 obtains the transmission of metrics attributes and at (3), processes the transmitted operations information. Illustratively, the metric processing component 102 can be configured to process the collected in a number of ways, including the generation of an anomaly hierarchy. In some embodiments, the metric processing component 102 can generate outputs illustrative of the generated hierarchy and anomaly scores. Additionally, the metric processing component 102 can store or archive the generated hierarchy and anomaly scores. With reference to FIG. 5, as described above, collected operations information (e.g., individual metric attributes) 512A-512B are associated with a group level, 510B. Generally described, individual operations information can be organized into one or more grouping of metric attributes. The groupings can be based on various organization criteria, such as common source of the metric information (e.g., file system information), size of the information, format, and the like. Accordingly, the metric processing component 102 can apply one or more machine learning techniques to the collected operations information to generate group-level anomaly score for group 510B based on the inputs 512A-512B. Although not shown for simplicity of the illustration, group 510A would also receive a set of individual metrics to generate a group-based anomaly score.

The metric processing component 102 can then apply each group-level anomaly score as inputs into another iteration of a machine learning technique to generate component-level anomaly scores. Generally described, individual component level information can correspond to one or more identifiable devices or software processes (e.g., virtual machine instances). In this regard, while the collected operations information 512 would be direct inputs to the groups 512, the anomaly scores from the groups would be inputs to the components 508. As illustrated in FIG. 5, the anomaly scores for groups 510A-510B would be inputs to component 508A. Component 508*b* would have inputs from one or more groups, which may or may not have overlap with groups inputted to other components, such as component 508A. Still further, the metric processing component 102 can then apply each component-level anomaly score as inputs into another iteration of a machine learning technique to generate region-level anomaly scores. For example, anomaly scores for components 508A-508B would be inputs into region II 504B. Although not shown for simplicity of the illustration, regions 504A, and 504B would also receive different inputs from components.

Finally, the metric processing component can then apply each region-level anomaly score as inputs into yet another iteration of a machine learning technique to generate a system-level anomaly score for system 502. As described above, while FIG. 5 is illustrated with four distinct levels, the metric processing component 102 can incorporate different or alternative levels in the hierarchy or otherwise remove a level, such as the region level from the hierarchy. For example, components may be associated with one or more levels prior to incorporation into regions.

Returning to FIG. 4, for purposes of illustrating aspects of the present application, at (4), the metric processing component 102 identifies an anomaly. As described above, an identification of an anomaly in a group anomaly score (e.g., 510B) would have the potential to propagate to an anomaly in a component anomaly score (e.g., 508A). The identification of an anomaly in a component anomaly score would propagate to a region anomaly score (e.g., 508B) and to the system anomaly score 502. Thus, the metric processing component 102 can determine an anomaly utilizing any one of the anomaly scores for the hierarchy or trigger based on the system anomaly score. At (5), the metric processing component 102 can then utilize the hierarchy to identify the likely source of the anomaly. For example, the metric processing component 102 can identify the region score that is source, contributor or otherwise had the biggest influence of the system anomaly score. The metric processing component 102 can then identify for that region, the component score that was the source, contributor or otherwise had the biggest influence of the region anomaly score. The metric processing component 102 can then identify for the component, the group score that was the source, contributor or otherwise had the biggest influence of the component anomaly score. Finally, the metric processing component 102 can identify the metric attributes that were the source, contributor or otherwise had the biggest influence of the group score.

Figure 6:
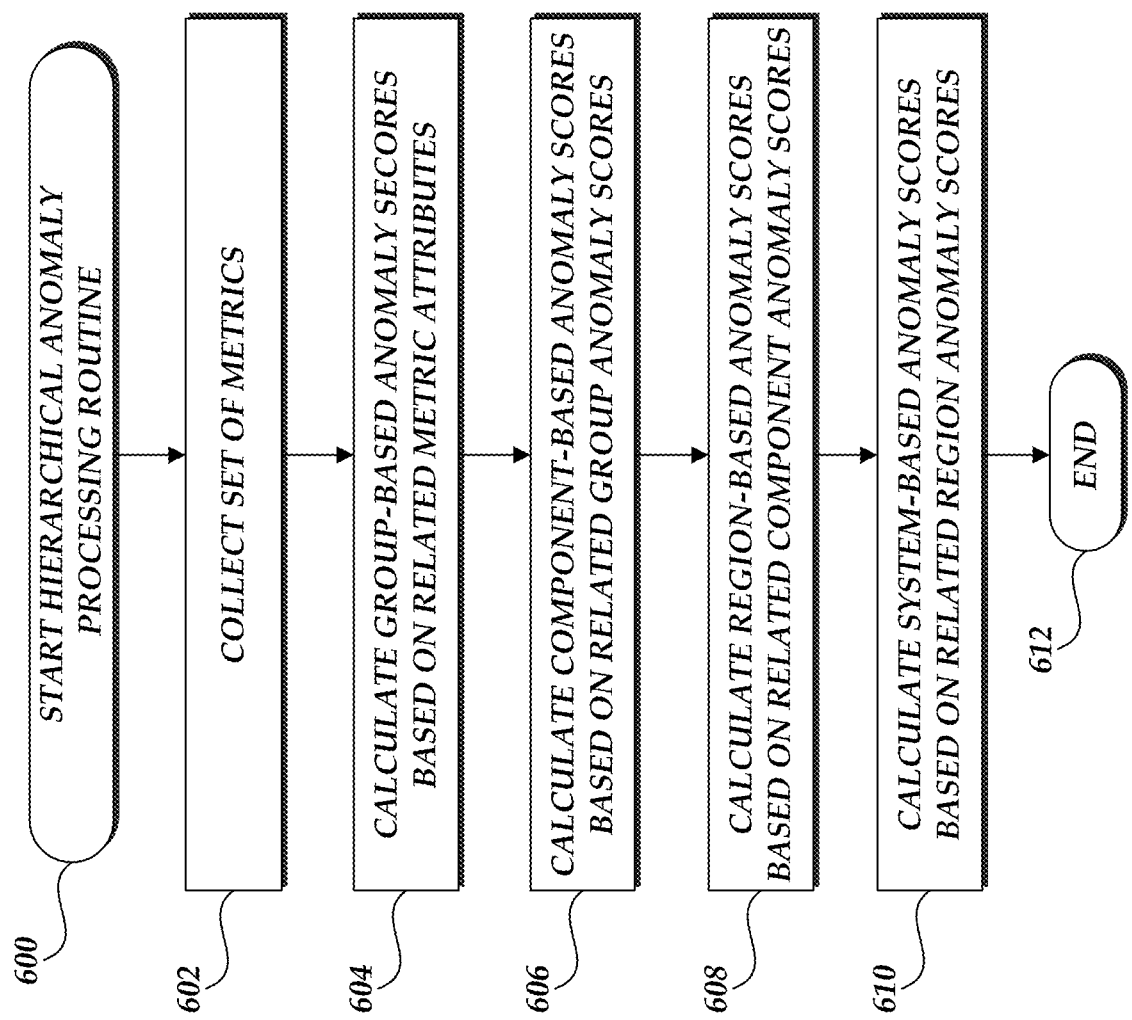
FIG. 6 is a flow diagram illustrative of a hierarchy anomaly processing routine implemented by a metric processing component in accordance with an illustrative embodiment.

FIG. 6 is a flow diagram illustrative of a hierarchical anomaly processing routine 600 implemented by a monitoring processing service component 120 in accordance with an illustrative embodiment. Routine 600 illustrates the utilization of a hierarchy anomaly structure for processing collected operations information. At block 602, the metric processing component 102 obtains the transmission of collected operations information from a virtual machine resource (or set of virtual machine resources). As described above, the operations information can include, but is not necessarily limited to, file system information, network interface information and resource consumption information. For example, the agent 106 can collect information related to CPU utilization during a defined time window or a specified time intervals. In another example, the agent 106 can collect operations information related to measure packet loss rates, network packet retransmission rates, etc. In still other example, the agent 106 can collect operations information related to times and success rates for various virtual machine resource I/O operations, such as data reads or data write operations. In still a further example, the agent 106 can collect any error conditions or error logs generated during the operation of the components 104A, 104B, and 104C. For purposes of the present application, the collected operations information can be identified by individual metrics (e.g., CPU utilization or input/output reads). Additionally, each metric can be further defined by the specific attributes or values collected (e.g., a CPU utilization of x % at time Y).

At block 604, the metric processing component 102 calculates group-based anomaly scores based on related metric attributes. As also described above, collected operations information (e.g., individual metric attributes) are associated with one or more group levels in the hierarchy (FIG. 5). Accordingly, the metric processing component 102 can apply one or more machine learning techniques to generate group-level anomaly score for individual groups based on the inputs. In one embodiment, the metric processing component 102 can receive configuration information that defines which metrics are associated with the groups. Alternatively, the metric processing component 102 can utilize meta-data included in the collected metrics, such as group identifiers, that indicate or defines the group, component, or regions for that metric information. Block 604 may continue until all metric information has been received, after a threshold amount of metric information has been received, after a period of time, or upon receipt of instructions to proceed.

At block 606, the metric processing component 102 calculates component-based anomaly scores based on related group-based anomaly scores calculated at block 604. As also described above, group-based anomaly scores are associated with one or more component levels in the hierarchy (FIG. 5). Accordingly, the metric processing component 102 can apply one or more machine learning techniques to generate component-level anomaly score for individual components based on the inputs of the previously calculated group-based anomaly scores. The metric processing component 102 can utilize the same or a common machine learning technique (trained for the component level processing) or alternative machine learning techniques. In one embodiment, the metric processing component 102 can receive configuration information that defines which groups are associated with the components. Alternatively, the metric processing component 102 can utilize meta-data included in the collected metrics, such as group identifiers, that indicate or defines the group, component, or regions for that metric information.

At block 608, the metric processing component 102 calculates region-based anomaly scores based on related component-based anomaly scores calculated at block 606. As also described above, component-based anomaly scores are associated with one or more region levels in the hierarchy (FIG. 5). Accordingly, the metric processing component 102 can apply one or more machine learning techniques to generate region-level anomaly score for individual components based on the inputs of the previously calculated component-level anomaly scores. The metric processing component 102 can utilize the same or a common machine learning technique for the group or component level calculations (trained for the region level processing) or alternative machine learning techniques. In one embodiment, the metric processing component 102 can receive configuration information that defines which components are associated with the regions. Alternatively, the metric processing component 102 can utilize meta-data included in the collected metrics, such as group identifiers, that indicate or defines the group, component, or regions for that metric information.

At block 610, the metric processing component 102 calculates a system-based anomaly scores based on related region-based anomaly scores calculated at block 608. As also described above, region-based anomaly scores are associated with the highest system based anomaly score in the hierarchy (FIG. 5). Accordingly, the metric processing component 102 can apply one or more machine learning techniques to generate a system-level anomaly score based on the inputs of the region-level anomaly scores. The metric processing component 102 can utilize the same or a common machine learning technique for the group, component or regional level calculations (trained for the system level processing) or alternative machine learning techniques. At block 612, the routine 600 terminates or conducts another iteration starting at block 602.

Figure 7:
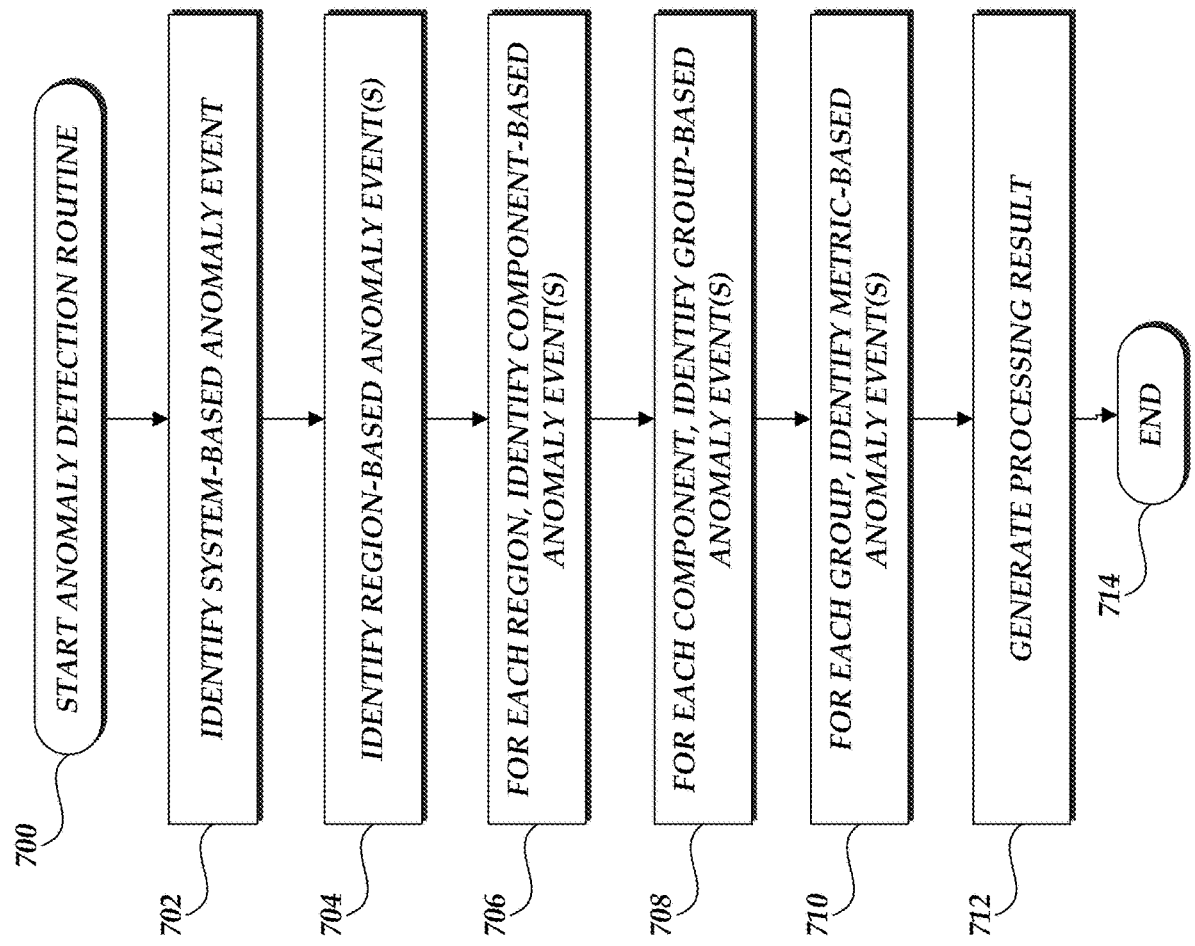
FIG. 7 is a flow diagram illustrative of an anomaly detection routine implemented by a metric processing component in accordance with an illustrative embodiment.

FIG. 7 is a flow diagram illustrative of an anomaly detection routine 700 implemented by the metric processing component 102. As described above, an identification of an anomaly in a group anomaly score (e.g., 510B) would have the potential to propagate to an anomaly in a component anomaly score (e.g., 508A). The identification of an anomaly in a component anomaly score would propagate to a region anomaly score (e.g., 508B) and to the system anomaly score 502. Thus, the metric processing component 102 can determine an anomaly utilizing any one of the anomaly scores for the hierarchy or trigger based on the system anomaly score. The metric processing component 102 can then utilize the hierarchy to identify the likely source of the anomaly. At block 702, the metric processing component 102 identifies the system based anomaly. At block 704, the metric processing component 102 can identify the region score that is source, contributor or otherwise had the biggest influence of the system anomaly score. Illustratively, one or more region based scores may be indicative of an anomaly.

At block 706, for each region identified in block 704, the metric processing component 102 can then identify the component score that was the source of the region anomaly score. At block 708, for each component identified in block 706 (for each identified region), the metric processing component 102 can then identify the group score that was the source, contributor or otherwise had the biggest influence of the component anomaly score. At block 710, for each component identified in block 708 (for each identified region and component), the metric processing component 102 can identify the metric attributes that were the source of the group score.

At block 712, the metric processing component 102 generates a processing result. Illustratively, the processing results can include the identification of the system, region, component, group, or individual anomaly scores. Additionally, the metric processing component 102 can provide any additional meta-data or processing information utilized in the identification of the anomaly scores. For example, the metric processing component 102 can identify individual metric attributes for the group-level anomaly scores or individual anomaly scores for the component, region and system-level anomaly scores that there the source, contributor or otherwise had the biggest influence in the determined anomaly score. At block 714, the routine 700 terminates or begins a new iteration at block 702.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method to manage the processing of monitoring information by virtual machine resources comprising:
obtaining, at a metric processing component, operations information, the operations information including at least one collected metric attribute by an agent associated with a virtual machine resource;

generating, by the metric processing component, a hierarchical structure made up of a set of anomaly scores for individual levels of the hierarchical structure, wherein the set of anomaly scores includes one or more group level anomaly scores formed from the obtained operations information, one or more component level anomaly scores formed from the one or more group level anomaly scores, and a system level anomaly score formed from the one or more component level anomaly scores, wherein the set of anomaly scores is determined based on applying a machine learning technique;

identifying, by the metric processing component, the system level anomaly score indicative of an anomaly;

identifying, by the metric processing component, a component level anomaly score that is determined to be a source of the identified system level anomaly score wherein the identified system level anomaly score is higher in the hierarchical structure than the identified component level anomaly score;

identifying, by the metric processing component, a group level anomaly score that is determined to be a source of the identified component level anomaly score, wherein the identified component level anomaly score is higher in the hierarchical structure than the identified group level anomaly score;

identifying, by the metric processing component, one or more metric attributes that are determined to be a source of the identified group level anomaly score; and generating, by the metric processing component, a processing result corresponding to the identified system level, component level and group level anomaly scores.

2. The method as recited in claim 1, wherein the machine learning technique includes at least one of a principle component analysis or a random cut forest tree machine learning technique.

3. The method as recited in claim 1, wherein the hierarchical structure includes a region level residing between a system level and a component level.

4. The method as recited in claim 1, wherein the operations information includes at least one of file system information, networking interface information, or computing device resource information.

5. The method as recited in claim 1, wherein generating the hierarchical structure includes generating anomaly scores by applying a common machine learning technique for each respective anomaly score.

6. A system to manage the processing of operations information comprising:

one or more virtual machine instances executing applications, wherein individual virtual machine instances collect operations information that includes at least one metric attribute and transmit the collected operations information; and a metric processing component implemented on at least one computing device including a processor and a memory, the metric processing component configured to receive the collected operations information and manage the processing of the collected operations information, the metric processing component configured to:

obtain the collected operations information from the individual virtual machine instances, the collected operations information including a plurality of metric attributes;

generate a hierarchical structure defining anomaly scores for individual levels of the hierarchical structure based on machine learning, the anomaly scores include one or more group level anomaly scores formed from the obtained one or more metric attributes, one or more component level anomaly scores formed from the one or more group level anomaly scores, and a system level anomaly score formed from the one or more component level anomaly scores;

identify, using the hierarchical structure, the system level anomaly score indicative of an anomaly, a component level anomaly score that is determined to be a source of the identified system level anomaly score, a group level anomaly score that is determined to be a source of the identified component level anomaly score, and a metric attribute of the one or more metric attributes that is determined to be a source of the anomaly, wherein the identified system level anomaly score is higher in the hierarchical structure than the identified component level anomaly score and wherein the identified component level anomaly score is higher in the hierarchical structure than the identified group level anomaly score; and generate a processing result based on processing the hierarchical structure and corresponding to determination of the anomaly.

7. The system as recited in claim 6, wherein the virtual machine instances transmit the operations information based on determination of one or more criterion.

8. The system as recited in claim 6, wherein the metric processing component generates the hierarchical structure including the one or more group anomaly scores formed from the obtained operations information, the one or more component anomaly scores formed from the one or more group anomaly scores, and the system anomaly score formed from the one or more component anomaly scores.

9. The system as recited in claim 6, wherein the metric processing component generates the hierarchical structure including the one or more group anomaly scores formed from the obtained operations information, the one or more component anomaly scores formed from the one or more group anomaly scores, one or more region anomaly scores formed from the one or more component anomaly scores, and the system anomaly score formed from the one or more region anomaly scores.

10. The system as recited in claim 6, wherein the collected operations information can include at least one of file system information, network interface information or resource consumption information.

11. The system as recited in claim 6, wherein the collected operations information can include at least one of measure packet loss rates, network packet retransmission rates, data reads or data write operations, or CPU utilization.

12. The system as recited in claim 6, wherein the metric processing component generates the hierarchical structure includes generating the anomaly scores utilizing a common machine learning technique.

13. The system as recited in claim 6, wherein the metric processing component generates the hierarchical structure by generating the system anomaly score, and the one or more component and group anomaly scores.

14. A computer-implemented method to manage operations information comprising:

obtaining metric attributes from agents;

generating a hierarchical structure identifying anomaly scores for individual levels of the hierarchical structure based on machine learning, wherein the anomaly scores include one or more group level anomaly scores formed from the obtained metric attributes, one or more component level anomaly scores formed from the one or more group level anomaly scores, and a system level anomaly score formed from the one or more component level anomaly scores;

processing the hierarchical structure to identify a likely source of an anomaly by identifying the system level anomaly score indicative of the anomaly, a component level anomaly score that is determined to be a source of the identified system level anomaly score, a group level anomaly score that is determined to be a source of the identified component level anomaly score, and the one of the metric attributes that is determined to be a source of the identified group level anomaly score, wherein the identified system level anomaly score is higher in the hierarchical structure than the identified component level anomaly score and wherein the identified component level anomaly score is higher in the hierarchical structure than the identified group level anomaly score; and determining a processing result associated with the anomaly.

15. The method as recited in claim 14, wherein generating the hierarchical structure includes calculating one or more group anomaly scores based on the received metric attributes, one or more component anomaly scores based on the one or more group anomaly scores, and a system anomaly score based on the one or more component anomaly scores.

16. The method as recited in claim 15, wherein generating the hierarchical structure includes calculating one or more region anomaly scores based on the one or more component anomaly scores, wherein the system anomaly score is based on the one or more region anomaly scores.

17. The method as recited in claim 14, wherein the metric attributes can include at least one of file system information, network interface information or resource consumption information.

18. The method as recited in claim 14, wherein generating the hierarchical structure includes generating the anomaly scores utilizing a common machine learning technique.

19. The method as recited in claim 15, wherein determining the processing result includes identifying at least one of a source or contributor to system level, component level and group level anomaly scores.

20. The method as recited in claim 14, wherein generating the hierarchical structure identifying anomaly scores for individual levels of the hierarchical structure based on machine learning of one of the metric attributes or lower level anomaly scores includes identifying lowest level anomaly scores based on machine learning of the metric attributes for a lowest level of the hierarchical structure.

* * * * *

UNITED STATES PATENT AND TRADEMARK OFFICE
CERTIFICATE OF CORRECTION

PATENT NO. : 10,884,805 B2
APPLICATION NO. : 15/898030
DATED : January 5, 2021
INVENTOR(S) : Wei Huang et al.

Page 1 of 1

It is certified that error appears in the above-identified patent and that said Letters Patent is hereby corrected as shown below:

In the Drawings

In sheet 6 of 7, FIG. 6, reference numeral 604, Line 1, delete "SECORES" and insert --SCORES--.

In the Claims

In Column 13, Line 16, Claim 1, delete "score" and insert --score,--.

Signed and Sealed this
Ninth Day of March, 2021

Drew Hirshfeld
*Performing the Functions and Duties of the
Under Secretary of Commerce for Intellectual Property and
Director of the United States Patent and Trademark Office*